US011287387B2

(12) United States Patent
Kelly et al.

(10) Patent No.: US 11,287,387 B2
(45) Date of Patent: Mar. 29, 2022

(54) MEASUREMENTS AND CALIBRATION UTILIZING COLORIMETRIC SENSORS

(71) Applicant: KONINKLIJKE PHILIPS N.V., Eindhoven (NL)

(72) Inventors: Declan Patrick Kelly, Shanghai (CN); Wei Zhong Chen, Shanghai (CN)

(73) Assignee: KONINKLIJKE PHILIPS N.V., Eindhoven (NL)

(*) Notice: Subject to any disclaimer, the term of this patent is extended or adjusted under 35 U.S.C. 154(b) by 324 days.

(21) Appl. No.: 16/525,783

(22) Filed: Jul. 30, 2019

(65) Prior Publication Data

US 2019/0353598 A1    Nov. 21, 2019

Related U.S. Application Data

(63) Continuation of application No. 15/535,558, filed as application No. PCT/EP2015/080382 on Dec. 18, 2015.

(30) Foreign Application Priority Data

Dec. 24, 2014  (WO) ................ PCT/CN2014/094773
Feb. 11, 2015  (EP) .................................... 15154644

(51) Int. Cl.
    *G01N 21/78*    (2006.01)
    *G01N 21/77*    (2006.01)

(52) U.S. Cl.
    CPC ... *G01N 21/783* (2013.01); *G01N 2021/7769* (2013.01)

(58) Field of Classification Search
    CPC ......... G01N 21/783; G01N 2021/7769; G01N 31/22; G01N 21/253; G01N 21/78
    See application file for complete search history.

(56) References Cited

U.S. PATENT DOCUMENTS

| 7,981,364 B2 | 7/2011 | Robins |
| 8,537,358 B2 | 9/2013 | Rakow |

(Continued)

FOREIGN PATENT DOCUMENTS

| JP | H0894530 | 4/1996 |
| JP | 2004239536 | 8/2004 |

(Continued)

OTHER PUBLICATIONS

Schaefer, "Colorimetric Water Quality Sensing with Mobile Smart Phones", The University of British Columbia, 2012, pp. 1-100. Highlight: p. ii (abstract).

(Continued)

*Primary Examiner* — Lore R Jarrett (57) ABSTRACT

Methods and apparatuses for determining levels of gaseous elements and optionally utilizing the determined levels to calibrate one or more sensors of an air purifier. For example, in some implementations a first image is captured of a colorimetric sensor device at the start of a sensing period and a second image is captured of the colorimetric sensor device at the end of the sensing period. The colorimetric sensor device includes at least one colorimetric sensor configured to change colors in response to reaction with a gaseous pollutant. Values may be determined based on the colors of the colorimetric sensor in the first and second images and the values may be utilized to determine a pollution value indicative of the amount of the gaseous pollutant to which the colorimetric sensor was exposed during the sensing period.

20 Claims, 4 Drawing Sheets

(56) References Cited

U.S. PATENT DOCUMENTS

| | | |
|---|---|---|
| 2005/0207950 A1* | 9/2005 | Schroder ............... B01D 53/30 |
| | | 422/186.04 |
| 2007/0247629 A1 | 10/2007 | Kim |
| 2008/0084553 A1 | 4/2008 | Neiss |
| 2010/0166604 A1 | 4/2010 | Lim |
| 2011/0281367 A1 | 11/2011 | Walte |
| 2013/0096030 A1 | 4/2013 | Jeppesen |
| 2013/0262008 A1 | 10/2013 | Ramanathan |
| 2013/0330831 A1* | 12/2013 | Morrow ................. G01N 21/78 |
| | | 436/169 |

FOREIGN PATENT DOCUMENTS

| | | |
|---|---|---|
| WO | 2004/014442 | 2/2004 |
| WO | 2013/116831 | 8/2013 |

OTHER PUBLICATIONS

Ground Level Ozone Testing, Dec. 1995, pp. 1-3.
Damien Igoe, "Analysing Urban Aerosols using a Digital Camera", University of Southern Queensland, Feb. 2011, pp. 1-128. Highlight "p. 1,3,4,19,21, p. 42,43,61".
Damien Igoe, "Development and Characterisation of a Modified Smartphone Camera for Determining UVA Aerosol Optical Depth", University of Southern Queensland, 2013, pp. 1-152. Highlight: p. 2,11,12,29.

\* cited by examiner

MEASUREMENTS AND CALIBRATION UTILIZING COLORIMETRIC SENSORS

CROSS REFERENCE TO RELATED APPLICATIONS

The present application is a Continuation of U.S. patent application Ser. No. 15/535,558 filed on Jun. 13, 2017, which was a U.S. National Phase application of International Patent Application No. PCT/EP2015/080382 filed on Dec. 18, 2015, which claimed priority from European Patent Application No. 15154644.7 filed on Feb. 11, 2015, and claimed priority from to International Patent Application No. PCT/CN2014/094773 filed Dec. 24, 2014. Priority is claimed, as applicable under 35 U.S.C. § 119(e) or 35 U.S.C. § 120, and the entire disclosures of the above-referenced patent applications are specifically incorporated by reference.

FIELD OF THE INVENTION

The present invention is directed generally to determining levels of one or more gaseous elements and optionally utilizing the determined levels to calibrate one or more sensors of an air purifier and/or otherwise adjust the functioning of the air purifier. More particularly, various inventive methods and apparatus disclosed herein relate to determining a level of a gaseous pollutant based on analysis of one or more captured images of a device having at least one colorimetric sensor responsive to the gaseous pollutant.

BACKGROUND OF THE INVENTION

In some implementations, colorimetric sensors may be configured to change colors when they are exposed to one or more gaseous elements such as a gaseous pollutant. For example, a colorimetric sensor may include a chemical material that is chosen to react with a particular gaseous pollutant or one or more elements of the gaseous pollutant. Gaseous pollutants may include, for example, sulfur dioxide, nitrogen oxide, nitrogen dioxide, ozone, and/or formaldehyde. The chemical material of the colorimetric sensor may change colors in response to the reaction and the degree of color change may be dependent on the amount of time the colorimetric sensor is exposed to the pollutant and/or on a concentration of the pollutant in the air being monitored. The change of color will provide an indication of the amount of the pollutant in the air being monitored. For example, a change to a first color over may indicate a concentration of 0.1 milligrams per cubic meter ($mg/m^3$), whereas a change to a second color may indicate a concentration of 0.3 $mg/m^3$. As another example, a change to a first color over a first time period may indicate a concentration of 0.1 $mg/m^3$, whereas a change to the first color over a second time period (that is shorter than the first time period) may indicate a concentration of 0.3 $mg/m^3$.

In many situations, colorimetric sensors configured to sense gaseous elements may inadvertently contact air between production and actual use by a consumer. Inadvertent contact with air may expose the colorimetric sensors to gaseous elements prior to actual testing, which may lead to inaccurate color readings in many situations. Preventing inadvertent contact with air may require special packaging, special storage, and/or careful handling by the consumer. Additionally, in many situations the color of a colorimetric sensor following testing must be matched by a consumer to a corresponding color and associated gaseous element concentration or other measure. Many consumers may find such a step burdensome and/or may have difficulty discriminating between multiple color options with only very minor variations.

Thus, there is a need in the art to provide methods and apparatus that lessen issues related to inadvertent contact of colorimetric sensors with air prior to actual use by a consumer and/or that lessen or eliminate the need for consumers to discriminate between multiple options in matching the color of a colorimetric sensor following testing.

SUMMARY OF THE INVENTION

The present disclosure is directed to inventive methods and apparatus for determining levels of gaseous elements and optionally utilizing the determined levels to calibrate one or more sensors of an air purifier and/or otherwise adjust the functioning of the air purifier. For example, in some implementations a first image is captured of a colorimetric sensor device at the start of a sensing period and a second image is captured of the colorimetric sensor device at the end of the sensing period. The colorimetric sensor device includes at least one colorimetric sensor configured to change colors in response to reaction with one or more elements of a gaseous pollutant. Values may be determined based on the colors of the colorimetric sensor in the first and second images and the values may be utilized to determine a pollution value indicative of the amount of the gaseous pollutant to which the colorimetric sensor was exposed during the sensing period. For example, the pollution value may be determined based on subtracting a first value determined based on the color of the colorimetric sensor in the first image from a second pollution value determined based on the color of the colorimetric sensor in the second image. In some implementations, the first and/or second values may also be based on a static reference color display of the colorimetric sensor device to account for, inter alia, potentially variable light conditions associated with the first and/or second images. A length of the sensing period (e.g., as indicted by timestamps associated with the first and second images) may also optionally be taken into account in determining the pollution value.

In various implementations, a determined pollution value may be utilized to calibrate an electronic sensor of an air purifier and/or otherwise adjust the functioning of the air purifier. For example, a colorimetric sensor based pollution value for a pollutant may be determined utilizing one or more colorimetric sensors as described above. An air purifier sensor based pollution value for the pollutant may also be determined utilizing one or more electronic sensors of the air purifier. The colorimetric sensor based pollution value may be compared to the air purifier sensor based pollution value and the one or more electronic sensors calibrated based on the comparison. As another example, a colorimetric sensor based pollution value for a pollutant may be determined utilizing one or more colorimetric sensors as described above and one or more other aspects of the functioning of the air purifier may be adjusted based on the colorimetric sensor based pollution value. For instance, the volume of air processed by the air purifier over a given period of time may be adjusted (up or down) based on the colorimetric sensor based pollution value. Also, for instance, one or more components of the air purifier may be activated and/or deactivated based on the colorimetric sensor based pollution value.

Generally, in one aspect, a method is provided that includes capturing, at a first time, a first electronic image of a device having at least one colorimetric sensor. The colorimetric sensor is configured to change color in response to exposure to one or more pollutants and the degree of change of the color is dependent on the concentration of the one or more pollutants. The method further includes: capturing, at a second time later than the first time, a second electronic image of the colorimetric sensor; determining a first value based on the color of the colorimetric sensor in the first electronic image; determining a second value based on the color of the colorimetric sensor in the second electronic image; and determining a pollution value for the one or more pollutants based on the first value and the second value.

In some implementations, the method further includes: identifying an air purifier pollution value for the one or more pollutants, the air purifier pollution value being based on one or more measurements of at least one electronic sensor of an air purifier; and determining an adjustment to calibrate the electronic sensor of the air purifier based on comparing the pollution value to the air purifier pollution value. In some versions of those implementations, the one or more measurements include measurements taken between the first time and the second time. Optionally, the one or more measurements may be restricted to measurements taken on or after the first time and on or before the second time. In some implementations, the method further includes: providing a first electronic signal to the air purifier substantially simultaneous with capturing the first electronic image; providing a second electronic signal to the air purifier substantially simultaneous with capturing the second electronic image; wherein the one or more measurements on which the air purifier pollution value is based include measurements taken on or after receipt of the first signal by the air purifier and on or before receipt of the second signal by the air purifier.

In some implementations, determining the first value based on the colorimetric sensor in the first electronic image includes: determining the first value based on the color, in the first electronic image, of the colorimetric sensor and based on one or more colors, in the first electronic image, of a static reference color display of the device. In some versions of those implementations, the reference color display is a longitudinally extending color strip including a range of colors along a length of the longitudinally extending color strip. In some versions of those implementations, determining the first value of the colorimetric sensor in the first electronic image includes: determining a first color value based on the color of the colorimetric sensor in the first electronic image; determining a color adjustment based on comparison of the one or more colors of the reference color display to one or more anticipated colors; and determining the first value based on the first color value and the color adjustment.

In some implementations, determining the pollution value is further based on a time difference between the first time and the second time.

In some implementations, determining the first value of the colorimetric sensor in the first electronic image includes: matching the color of the colorimetric sensor in the first electronic image to a reference color of the reference color display in the first electronic image, the reference color display having a plurality of colors; and determining the first value based on a position, in the first electronic image, of the reference color in the reference color display.

In some implementations, the first value is indicative of a first color and the second value is indicative of a second color and determining the pollution value for the one or more pollutants based on the first value and the second value includes: determining a first pollution value based on the first value; determining a second pollution value based on the second value; and determining the pollution value based on a difference between the first pollution value and the second pollution value. In some versions of those implementations, determining the pollution value based on a difference between the first pollution value and the second pollution value includes: determining the pollution value based on the difference and based on a time difference between the first time and the second time. In some versions of those implementations, the time difference may be determined based on a first timestamp associated with the first electronic image and a second timestamp associated with the second electronic image.

In some implementations, the degree of change of the color of the colorimetric sensor is dependent on the cumulative exposure of the colorimetric sensor with respect to the one or more pollutants.

Generally, in another aspect, a computer implemented method is provided that includes capturing an electronic image of a device having at least one colorimetric sensor and a reference color display. The colorimetric sensor is configured to change color in response to exposure to one or more pollutants and the degree of change of the color is dependent on the concentration of the one or more pollutants. The reference color display is static and includes a range of colors. The method further includes: determining a color of the colorimetric sensor in the electronic image; determining a modified color based on the color and based on one or more image colors of the reference color display in the electronic image; and determining a pollution value for the one or more pollutants based on an electronic mapping of the pollution value to the modified color.

In some implementations, the method further includes: identifying an air purifier pollution value for the one or more pollutants, the air purifier pollution value being based on one or more measurements of at least one electronic sensor of an air purifier; and determining an adjustment to calibrate the electronic sensor of the air purifier based on comparing the pollution value to the air purifier pollution value. In some versions of those implementations, the method further includes: providing an electronic signal to the air purifier substantially simultaneous with capturing the electronic image; wherein the air purifier pollution value is determined by the air purifier based on the electronic signal.

In some implementations, determining the modified color based on the color and based on the one or more image colors of the reference color display in the electronic image includes: determining a color adjustment based on comparison of the one or more image colors of the reference color display to one or more anticipated colors; and modifying the color based on the color adjustment to determine the modified color.

In some implementations, determining the modified color based on the color and based on the one or more image colors of the reference color display in the electronic image includes: matching the color of the colorimetric sensor in the electronic image to a reference color of the image colors of the reference color display; and determining the modified value based on a position, in the electronic image, of the reference color in the reference color display.

Generally, in another aspect, a system is provided that includes: a colorimetric sensor device and at least one computing device having one or more processors and memory storing instructions. The colorimetric sensor device has at least one colorimetric sensor and a reference color display. The colorimetric sensor is configured to change color in response to exposure to one or more pollutants and the reference color display includes a plurality of colors. Execution of the instructions by the one or more processors causes the at least one computing device to: identify a first electronic image of the colorimetric sensor device, the first electronic image being captured at a first time, identify a second electronic image of the colorimetric sensor device, the second electronic image captured at a second time later than the first time, determine a first value based on the color of the colorimetric sensor in the first electronic image, determine a second value based on the color of the colorimetric sensor in the second electronic image, and determine a pollution value for the one or more pollutants based on the first value and the second value.

In some implementations, the system further includes an air purifier. The air purifier includes an electronic pollution sensor and determines an air purifier pollution value for the one or more pollutants based on one or more measurements of the electronic pollution sensor. In those implementations, execution of the instructions by the one or more processors further cause the at least one computing device to: determine an adjustment to calibrate the electronic sensor based on comparing the pollution value to the air purifier pollution value.

Generally, in another aspect, a colorimetric sensor device is provided that includes: a plurality of colorimetric sensors, each of the colorimetric sensors configured to change color in response to exposure to one or more respective pollutants, and to a degree that is dependent on the concentration of the one or more pollutants. A first colorimetric sensor of the colorimetric sensors is responsive to a first pollutant and non-responsive to a second pollutant. A second colorimetric sensor of the colorimetric sensors is either: responsive to the second pollutant and non-responsive to the first pollutant; or responsive to the first pollutant and has a different degree of sensitivity to the first pollutant than the first colorimetric sensor. The colorimetric sensor device further includes a static reference color display that includes a range of colors. The colorimetric sensor device is free from any indicia that indicate a level of any pollutants associated with the static reference color display.

In some implementations, the static reference color display is a longitudinally extending color strip including the range of colors along a length of the longitudinally extending color strip.

For purposes of this disclosure, the term "color" is used interchangeably with the term "spectrum." However, the term "color" generally is used to refer primarily to a property of radiation that is perceivable by a sensor of a digital camera and/or an observer (although this usage is not intended to limit the scope of this term). Accordingly, the terms "different colors" implicitly refer to multiple spectra having different wavelength components and/or bandwidths. It also should be appreciated that the term "color" may be used in connection with white and non-white colors.

The term "controller" is used herein generally to describe various apparatus relating to the operation of one or more computing devices and/or air purifiers. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various implementations of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a computing device, an air purifier in general, a controller or processor associated with one or more computing devices or air purifiers, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g., for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF THE EMBODIMENTS

Colorimetric sensors may be configured to change colors when they are exposed to one or more gaseous elements such as a gaseous pollutant. In many situations colorimetric sensors configured to sense gaseous elements may inadvertently contact air between production and actual use by a consumer. Inadvertent contact with air may expose the colorimetric sensors to gaseous elements prior to actual testing, which may lead to inaccurate color readings in many situations. Additionally, in many situations the color of a colorimetric sensor following testing must be matched by a consumer to a corresponding color and associated gaseous element concentration or other measure. Many consumers may find such a step burdensome and/or may have difficulty discriminating between multiple color options with only very minor variations. Thus, the inventors have recognized and appreciated that it would be beneficial to provide methods that lessen issues related to inadvertent contact of colorimetric sensors with air prior to actual use by a consumer and/or that lessen or eliminate the need for consumers to discriminate between multiple options in matching the color of a colorimetric sensor following testing.

Figure 1:
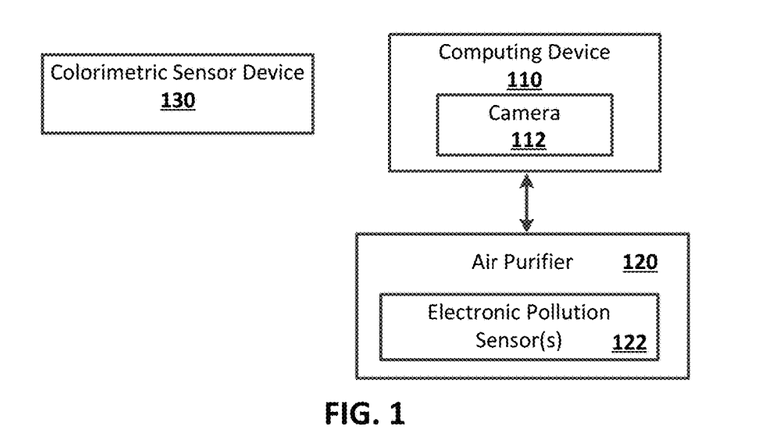
FIG. 1 illustrates an example environment in which pollution levels in air may be determined based on analysis of one or more captured images of a colorimetric sensor device and in which electronic pollution sensors of an air purifier may be calibrated based on determined pollution levels.

FIG. 1 illustrates an example environment in which pollution levels in air may be determined based on analysis of one or more captured images of a colorimetric sensor device and in which electronic pollution sensors of an air purifier may be calibrated based on determined pollution levels. The example environment of FIG. 1 includes a colorimetric sensor device 130, a computing device 110 having a camera 112, and an air purifier 120 having electronic pollution sensors 122.

The computing device 110 and the air purifier 120 may each include one or more controllers (e.g., processors) and one or more storage media. The storage media may store instructions that, when executed by the controllers, cause the computing device 110 and/or the air purifier 120 to perform one or more of the functions described herein. The computing device 110 and the air purifier 120 may also each include one or more network interfaces and may be in network communication with one another via the network interfaces. In some implementations, the computing device 110 and air purifier 120 may be in direct network communication with one another (e.g., via Bluetooth or a direct wired connection). In some implementations, other network topologies may be utilized to enable communication between the computing device 110 and the air purifier 120. For example, the computing device 110 and the air purifier 120 may be in network communication via a local area network (LAN) and may each be addressable on the LAN. One or more aspects of the computing device 110 and/or the air purifier 120 may be incorporated in a single system in some implementations. For example, in some implementations air purifier 120 may incorporate the camera 112 and may directly determine colorimetric sensor based pollution levels as described herein.

Generally, a user may utilize the computing device 110 to capture one or more images of the colorimetric sensor device 130 via the camera 112 of the computing device 110. As described in more detail herein, the computing device 110 may analyze the one or more images of the colorimetric sensor device 130 to determine one or more pollution values for one or more gaseous pollutants to which one or more colorimetric sensors of the colorimetric sensor device 130 are responsive. As one example, the computing device 110 may analyze a first image of the colorimetric sensor device 130 taken at a first time and a second image of the colorimetric sensor device 130 taken at a second time to determine a concentration of at least one pollutant in air to which the colorimetric sensor device 130 is exposed.

In various implementations, a pollution value determined by the computing device 110 may be utilized as a standard value to calibrate one of the electronic pollution sensors 122 of the air purifier 120. For example, the computing device 110 may determine a colorimetric sensor based pollution value for a pollutant based on one or more color values of a colorimetric sensor of the colorimetric sensor device 130. The air purifier 120 may also determine an air purifier sensor based pollution value for the pollutant utilizing measurements from one or more electronic pollution sensors 122. The air purifier sensor based pollution value may be communicated to the computing device 110 and the computing device 110 may compare such value to the colorimetric sensor based pollution value to calibrate the one or more electronic pollution sensors 122. As one example, assume the colorimetric sensor based pollution value indicates a pollutant concentration of 0.3 mg/m$^3$ and the air purifier sensor based pollution value indicates a pollution concentration of 0.5 mg/m$^3$. Based on the colorimetric sensor based pollution value being less than the air purifier sensor based pollution value, the computing device 110 may communicate with the air purifier 120 to reduce the sensitivity of measurements from the one or more electronic pollution sensors 122.

While the user may operate a plurality of computing devices, for the sake of brevity, examples described in this disclosure will focus on the user operating computing device 110. Moreover, while multiple users may interact with the air purifier 120 and/or the colorimetric sensor device 130 via multiple computing devices, for the sake of brevity, examples described in this disclosure will focus on a single user operating the computing device 110. The computing device 110 may be, for example, a desktop computing device, a laptop computing device, a tablet computing device, and/or a mobile phone computing device. Additional and/or alternative computing devices may be provided.

The computing device 110 includes one or more applications to facilitate the sending and receiving of data over a network (e.g., to and/or from the air purifier 120), to enable presentation (e.g., display) of images captured via the camera 112 and/or other data such as data pertaining to pollution levels, data instructing the user when or how to capture images of the colorimetric sensor device 130, etc. For example, the computing device 110 may execute one or more applications, such as a stand-alone application, that may perform all or aspects of the methods of FIGS. 3-5 and guide the user in capturing images in relation to the methods of FIGS. 3 and 4. In some implementations, the computing device 110 may include hardware that shares one or more characteristics with the example computing device that is illustrated in FIG. 6. The operations performed by one or more components of the example environment may optionally be distributed across multiple computing devices. For example, one or more of the steps performed by the computing device 110 may be performed via one or more computer programs running on one or more servers in one or more locations that are coupled to each other through a network (e.g., distributed computing).

Figure 2A:
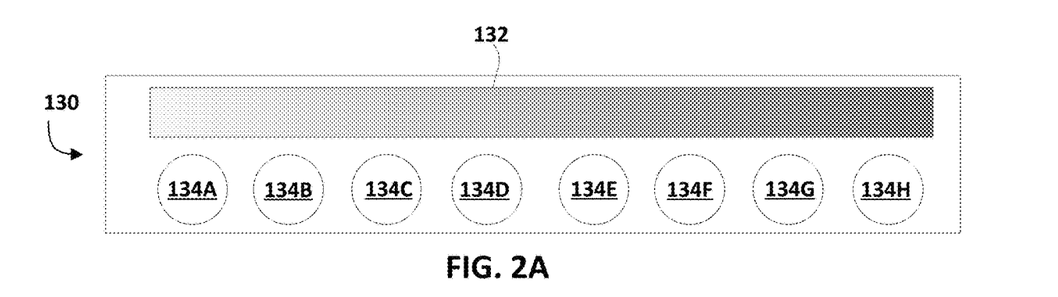
FIG. 2A illustrates an example of a colorimetric sensor device at a first time.
Figure 2B:
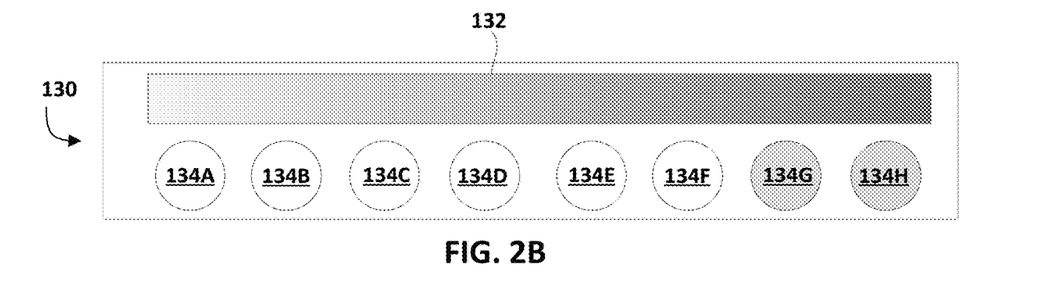
FIG. 2B illustrates an example of the colorimetric sensor device of FIG. 2A at a second time that is later in time than the first time.
Figure 2C:
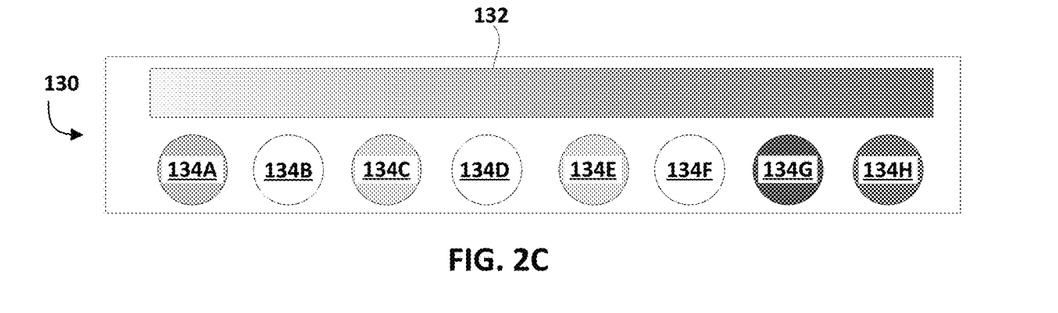
FIG. 2C illustrates an example of the colorimetric sensor device of FIG. 2A at a third time that is later in time than the first time and the second time.

With reference to FIGS. 2A-2C, an implementation of the colorimetric sensor device 130 is described in additional detail. The illustrated colorimetric sensor device 130 is a rectangular strip of material and includes a static reference color display 132 and eight colorimetric sensors 134A-H. In the illustrated implementation, the static reference color display 132 is a longitudinally extending strip that includes a range of colors that vary along a length (i.e., from left to right) of the longitudinally extending strip. Various shades of gray are illustrated in FIGS. 2A-2C to represent different colors. For example, the lightest gray in the static reference color display 132 may represent red and the darkest gray may represent blue, with the grays in between including lighter shades of red, mixtures of red and blue (i.e., shades of purple), and lighter shades of blue. In other words, moving from left to right in the static reference color display 132, the left most point may be red, which transitions to lighter shades of red, then to purple, then to lighter shades of blue, then to blue at the right most point.

As described herein, the static reference color display 132 is static (i.e., it does not react in the same manner as colorimetric sensors 134A-H when exposed to pollutants) and may be used as a reference in determining pollution levels based on one or more images of the colorimetric sensor device 130. In some implementations, utilizing the static reference color display 132 as a reference may enable more accurate pollution level determination under varying lighting conditions, varying digital camera sensors, etc. than if no reference was utilized. Although the static reference color display 132 is illustrated as a longitudinally extending strip that includes a range of colors that vary along a length (i.e., from left to right) of the longitudinally extending strip, other configurations may be utilized. For example, in some implementations the static reference color display 132 may be a circular display with a range of colors that vary along the radius and/or circumference of the circle. Also, for example, in some implementations the static reference color display 132 may include more or fewer (e.g., one) colors than indicated in FIGS. 2A-2C. Also, for example, instead of a strip showing a range of colors with gradual changes, the static reference color display 132 may instead include a discrete set of two or more colors.

In the illustrated implementation, each of the colorimetric sensors 134A-H is substantially circular and each is configured to react with one or more elements of a particular gaseous pollutant. For example, colorimetric sensor 134A may include a chemical material that is chosen to react with sulfur dioxide, colorimetric sensor 134B may include a chemical material that is chosen to react with nitrogen oxide, etc. The chemical materials of the colorimetric sensors 134A-H may change colors in response to the respective reactions and the degree of color change may be dependent on the amount of time the colorimetric sensors are exposed to the respective pollutant and/or on a concentration of the respective pollutant in the air being monitored. The change of color will provide an indication of the amount of the pollutant in the air being monitored. Although the colorimetric sensors 134A-H are illustrated as circular, other shapes may be utilized such as oval, square, etc. Also, although eight colorimetric sensors 134A-H are illustrated, in some implementations more or fewer (e.g., one) colorimetric sensors may be provided.

Although some examples herein are described with respect to a gaseous pollutant value being determined based on a single colorimetric sensor, in some implementations two or more colorimetric sensors may be used to measure the value of a single pollutant. For example, in some implementations two or more colorimetric sensors may be responsive to a particular gaseous pollutant, but none of the colorimetric sensors may be perfectly sensitive for the particular gaseous pollutant. The cross sensitivity can be handled by having different levels of sensitivity among the two or more colorimetric sensors and the relative color changes of the multiple colorimetric sensors may be utilized to determine the actual pollution level.

FIG. 2A illustrates an example of the colorimetric sensor device 130 at a first time, such as shortly after manufacture or upon initial unpackaging by a consumer. Each of the colorimetric sensors 134A-H in FIG. 2A is illustrated as white in FIG. 2A, which denotes that the color of the colorimetric sensors 134A-H has not yet changed due to any reaction with pollutants. Although illustrated as white in FIG. 2A, in some implementations the non-reacted color of the colorimetric sensors 134A-H may vary. For example, in some implementations the non-reacted color of one or more of the colorimetric sensors 134A-H may be a light tan and/or a very light orange.

FIG. 2B illustrates an example of the colorimetric sensor device of FIG. 2A at a second time that is later in time than the first time. In FIG. 2B, the colorimetric sensors 134G and 134H are illustrated in light gray, denoting that the color of the colorimetric sensors 134G and 134H has changed due to reaction with respective pollutants. The reaction with the respective pollutants may be due to, for example, intentional exposure of the colorimetric sensor device 130 to air (e.g., for intentional sensing of pollutants) or inadvertent exposure of the colorimetric sensor device 130 to air (e.g., due to improper packaging and/or improper handling by a user).

FIG. 2C illustrates an example of the colorimetric sensor device of FIGS. 2A and 2B at a third time that is later in time than the first time and the second time. In FIG. 2C, the colorimetric sensors 134G and 134H are illustrated in a gray that is darker than the gray of FIG. 2B, denoting that the color of the colorimetric sensors 134G and 134H has changed to a greater extent than in FIG. 2B due to further reaction with respective pollutants. In FIG. 2C, the colorimetric sensors 134A, 134C, and 134E are also illustrated in light gray (colorimetric sensor 134A is a darker gray than colorimetric sensors 134C and 134E) denoting that the color of the colorimetric sensors 134A, 134C, and 134E has changed due to reaction with respective pollutants. The reaction with the respective pollutants may be due to, for example, intentional exposure of the colorimetric sensor device 130 to air for intentional sensing of pollutants.

Figure 3:
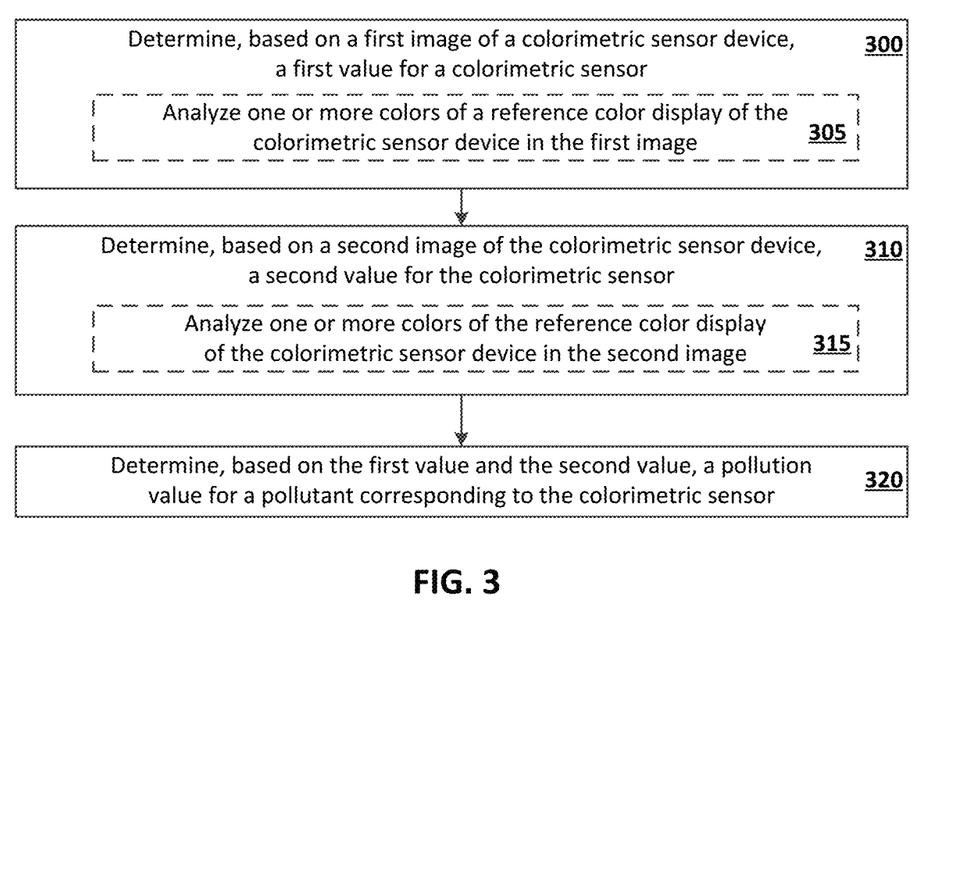
FIG. 3 is a flow chart illustrating an example method of determining a pollution level in air based on analysis of multiple captured images of a colorimetric sensor device.

FIG. 3 is a flow chart illustrating an example method of determining a pollution level in air based on analysis of multiple captured images of a colorimetric sensor device. Other implementations may perform the steps in a different order, omit certain steps, and/or perform different and/or additional steps than those illustrated in FIG. 3. For convenience, aspects of FIG. 3 will be described with reference to a system of one or more components that perform the process. The system may include, for example, the computing device 110. Also for convenience, aspects of FIG. 3 will be described with reference to captured images of the example colorimetric sensor device 130.

At step 300, a first value for a colorimetric sensor is determined based on a first image of a colorimetric sensor device. In some implementations, the first image may be captured via the camera 112 of the computing device 110. For example, a user may provide input via one or more user interface input devices of computing device 110 to capture an image of the colorimetric sensor device 130 at the beginning of a sensing period. The first value for the colorimetric sensor may be based on a color of the colorimetric sensor in the first image. For example, in some implementations the computing device 110 may utilize the color of the colorimetric sensor in the first image as the first value. Also, for example, as described below with respect to step 305, in some implementations the first value may be a modified color based on the color of the colorimetric sensor in the first image and based on one or more colors of a reference color display of the colorimetric sensor in the first image. The color may be represented in various manners such as a wavelength, an RGB value, a hexadecimal value, etc.

At optional step 305, one or more colors of a reference color display of the colorimetric sensor device in the first image are analyzed in determining the first value. For example, one or more colors of the static reference color display 132 may be analyzed to determine a modified color of the colorimetric sensor in the first image. Generally, the computing device 110 utilizes the static reference color display 132 as a reference to adjust the color of the colorimetric sensor in the first image (if necessary) to accommodate varying lighting conditions of the first image, varying digital camera sensors, etc.

In some implementations, the computing device 110 may compare one or more colors of the static reference color display 132 in the first image to one or more anticipated colors to determine a color adjustment to be applied to the color of the colorimetric sensor. For example, the anticipated colors of the static reference color display 132 may be stored on the computing device 110 and may indicate, from left to right, the following anticipated colors of the reference color display: a full range of reds (e.g., from 620 nm to 750 nm), varying mixtures of reds and blues, and a full range of blues (e.g., from 450 to 495 nm). The anticipated colors may be stored in nm or other format such as RGB or hexadecimal. Based on comparing the colors of the static reference color display 132 in the first image to the anticipated colors, the computing device 110 may determine that one or more colors of the static reference color display 132 in the first image are offset from the anticipated values and determine a modified color of the colorimetric sensor based on the offset(s). For example, the computing device 110 may determine the reds of the static reference color display 132 are offset approximately +25 nm and the blues of the static reference color display 132 are offset approximately −15 nm. In such an example, the computing device 110 may adjust the color of the colorimetric sensor in the first image based on the determined offsets.

In some implementations, the computing device 110 may match the color of the colorimetric sensor in the first image to one or more colors in the static reference color display 132, and determine the modified color of the colorimetric sensor based on a position, in the first image, of the reference color in the reference color display. For example, a mapping of colors to positions of the static reference color display 132 may be stored on the computing device 110. For instance, the leftmost vertical segment on the static reference color display 132 may be mapped to 750 nm (such value may be stored in nm or other format such as RGB or hexadecimal), a vertical segment 20% of the way along the static reference color display 132 (moving from left to right) may be mapped to 635 nm, etc. The computing device 110 may match the color of the colorimetric sensor in the first image to a color on the static reference color display 132 in the first image, and the color corresponding to a position of the color on the static reference color display 132 may be utilized as the modified color of the colorimetric sensor. For instance, the color of the colorimetric sensor in the first image may be 620 nm and mapped to a color on the static reference color display 132 in the first image that is approximately 20% of the way along the static reference color display 132. The position that is approximately 20% of the way along the static reference color display 132 may, in turn, be mapped to a color of 635 nm and 635 nm may be utilized as the modified color value of the colorimetric sensor. In some implementations, other techniques may be utilized to determine a modified color of the colorimetric sensor based on analysis of one or more colors of a reference color display of the colorimetric sensor device.

At step 310, a second value for the colorimetric sensor is determined based on a second image of the colorimetric sensor device. In some implementations, the image may be captured via the camera 112 of the computing device 110. For example, a user may provide input via one or more user interface input devices of computing device 110 to capture an image of the colorimetric sensor device 130 at the end of the sensing period. The end of the sensing period may be a time selected by the user, and may optionally be based on a recommended sensing time. The second value for the colorimetric sensor may be based on a color of the colorimetric sensor in the second image. For example, in some implementations the computing device 110 may utilize the color of the colorimetric sensor in the second image as the second value. Also, for example, as described below with respect to step 310, in some implementations the second value may be a modified color based on the color of the colorimetric sensor in the second image and based on one or more colors of a reference color display of the colorimetric sensor in the second image.

At optional step 315, one or more colors of the reference color display of the colorimetric sensor device in the second image are analyzed. For example, one or more colors of the static reference color display 132 may be analyzed to determine a modified color of the colorimetric sensor in the second image. Generally, the computing device 110 utilizes the static reference color display 132 as a reference to adjust the color of the colorimetric sensor in the second image (if necessary) to accommodate varying lighting conditions of the second image, varying digital camera sensors, etc.

Step 315 may share aspects in common with step 305, but will be adapted to the color of the colorimetric sensor in the second image, and the colors of the reference color display in the second image. In some implementations, the computing device 110 may compare one or more colors of the static reference color display 132 in the second image to one or more anticipated colors to determine a color adjustment to be applied to the color of the colorimetric sensor. In some implementations, the computing device 110 may match the color of the colorimetric sensor in the second image to one or more colors in the static reference color display 132, and determine the modified color of the colorimetric sensor based on a position, in the second image, of the reference color in the reference color display.

At step 320, a pollution value is determined for a pollutant corresponding to the colorimetric sensor of steps 300 and 310. The pollution value is determined based on the first value and the second value determined at steps 300 and 310. For example, the computing device may include a mapping of color values for the colorimetric sensor to corresponding pollution values and may utilize the mapping to determine a pollution value indicative of the amount of pollution sensed by the colorimetric sensor from the time the first image was captured to the time the second image was captured. For example, the first value of step 300 may be a first color mapped to a pollution concentration of 0.1 mg/m$^3$ and the second value of step 310 may be a second color mapped to a pollution concentration of 0.3 mg/m$^3$. The computing device 110 may determine the pollution value based on the difference between the two pollution concentrations (i.e., 0.2 mg/m$^3$). The mapping of the colors to the pollution values may be stored as, for example, a table of values, a calibration curve, a mathematical formula, etc. In some implementations, one or more of the colorimetric sensors may have a mapping that is particular to the pollutant sensed by the colorimetric sensor and/or the configuration of the colorimetric sensor. In other words, the computing device 110 may utilize a first mapping for colorimetric sensor 134A, a second mapping for colorimetric sensor 134B, etc.

In some implementations, the computing device 110 may determine the pollution value for the pollutant corresponding to the colorimetric sensor of steps 300 and 310 based at least in part on a time difference between the first image of step 300 and the second image of step 310. For example, each of the images may be associated with a timestamp (e.g., included in metadata of the image) and the time difference between the timestamps may be utilized in determining the pollution value. For example, assume the first value of step 300 is a first color mapped to a pollution concentration of 0.1 mg/m$^3$ and the second value of step 310 is a second color mapped to a pollution concentration of 0.3 mg/m$^3$. In determining the pollution value, the computing device 110 may optionally modify those values (up or down) based on the time difference and/or may modify the difference between those values (up or down) based on the time difference. For example, in some implementations of colorimetric sensors, for a given color change of a colorimetric sensor between a first image and a second image, a shorter time difference will result in a higher pollution value than a longer time difference.

Although the steps of FIG. 3 are described with respect to a single colorimetric sensor, it is understood that the steps may be repeated for each of a plurality of colorimetric sensors of a colorimetric sensor device to determine pollution levels for respective pollutants corresponding to those colorimetric sensors.

The example method of FIG. 3 may lessen issues related to inadvertent contact of colorimetric sensors with air prior to actual use by a consumer and/or may lessen or eliminate the need for consumers to discriminate between multiple options in matching the color of a colorimetric sensor following testing. For example, assume that the colorimetric sensor device 130 in the state of FIG. 2B is utilized at the start of a sensing period. In FIG. 2B, the colorimetric sensors 134G and 134H are illustrated in light gray, denoting that the color of the colorimetric sensors 134G and 134H has changed due to reaction with respective pollutants. The reaction with the respective pollutants may be due to, for example, inadvertent exposure of the colorimetric sensor device 130 to air (e.g., due to improper packaging and/or improper handling by a user). If the first image is of the colorimetric sensor device 130 in the state of FIG. 2B and the second image is of the colorimetric sensor device 130 in the state of FIG. 2C, the method of FIG. 3 will account for the initial inadvertent exposure of the colorimetric sensors 134G and 134H in determining pollution values corresponding to those sensors. Similarly, if two or more colorimetric sensors are used to measure a single gaseous pollutant, the method of FIG. 3 can be utilized to determine values for each of the two or more colorimetric sensors and determine a pollution value based on those multiple values. It is noted that it is beyond the skill of many consumers to analyze the relative changes of multiple sensors to determine an actual pollution level.

Although the example method of FIG. 3 is described with respect to a first image and a second image, in some implementations a pollution value may be determined for a pollutant corresponding to one or more colorimetric sensors based on only a single image of a colorimetric sensor device. For example, the "first value" of step 300 may be assumed to be a baseline color of a colorimetric sensor and the pollution value may be determined based on a value that is based on the color of the colorimetric sensor in only a single image. Also, for example, in some implementations a colorimetric sensor may be configured to reach an equilibrium state that corresponds to a respective concentration of pollution (without further changes when exposed to the same concentration for a longer time period)—and the pollution value may be determined based on a value that is based on the equilibrium color in only a single image. In some of those implementations, one or more colors of a reference color display of the colorimetric sensor device in the first image are analyzed in determining the value (e.g., as described above with respect to steps 305 and 315). For example, one or more colors of the static reference color display 132 may be analyzed to determine a modified color of the colorimetric sensor in the image.

Figure 4:
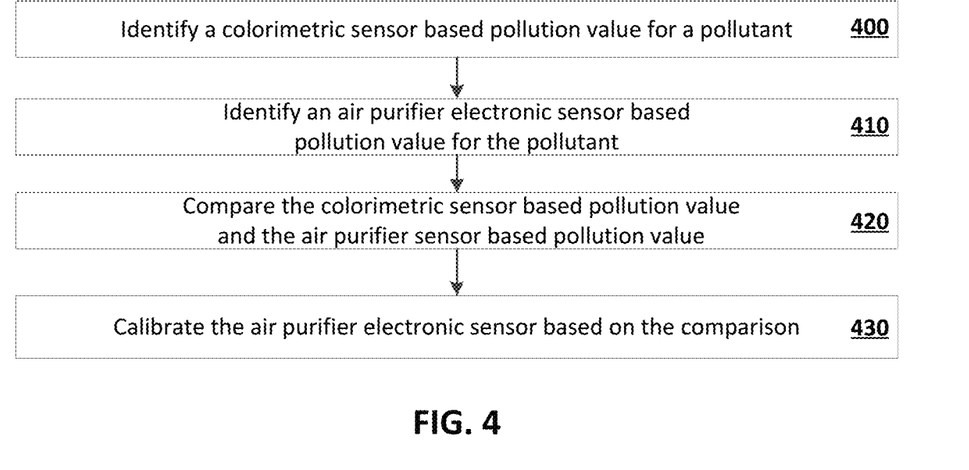
FIG. 4 is a flow chart illustrating an example method of calibrating an electronic sensor of an air purifier based on a colorimetric sensor based pollution value.

FIG. 4 is a flow chart illustrating an example method of calibrating an electronic sensor of an air purifier based on a colorimetric sensor based pollution value. Other implementations may perform the steps in a different order, omit certain steps, and/or perform different and/or additional steps than those illustrated in FIG. 4. For convenience, aspects of FIG. 4 will be described with reference to a system of one or more components that perform the process. The system may include, for example, the computing device 110 and/or the air purifier 120.

At step 400, a colorimetric sensor based pollution value for a pollutant is identified. In some implementations, the colorimetric sensor based pollution value may be a pollution value determined based on the example method of FIG. 3.

At step 410, an air purifier electronic sensor based pollution value for the pollutant is identified. For example, the air purifier 120 may provide the air purifier electronic sensor based pollution value. The air purifier sensor based pollution value may be determined utilizing one or more electronic pollution sensors 122 of the air purifier. In some implementations, the air purifier electronic sensor based pollution value may be a value determined based on measurements from the electronic pollution sensors 122 that are of a length of time similar to the length of time on which the colorimetric sensor based pollution value is based and/or that are taken at substantially the same time.

At step 420, the colorimetric sensor based pollution value and the air purifier electronic sensor based pollution value are compared. For example, the computing device 110 may compare the values to determine a difference between the values. As one example, assume the colorimetric sensor based pollution value indicates a pollutant concentration of 0.3 mg/m$^3$ and the air purifier sensor based pollution value indicates a pollution concentration of 0.35 mg/m$^3$. The computing device 110 may compare the values to determine a difference of 0.05 mg/m$^3$.

At step 430, the air purifier electronic sensor is calibrated based on the comparison of step 420. For example, if the comparison of step 420 indicates a difference between the values that varies by at least a threshold value, the computing device 110 may communicate with the air purifier 120 to cause the air purifier 120 to adjust the sensitivity of measurements from the one or more electronic pollution sensors 122. The degree to which the computing device 110 causes the air purifier 120 to adjust the sensitivity may be dependent on the magnitude of the difference between the values. As one example, assume the colorimetric sensor based pollution value indicates a pollutant concentration of 0.3 mg/m$^3$ and the air purifier sensor based pollution value indicates a pollution concentration of 0.35 mg/m$^3$. Based on the colorimetric sensor based pollution value being less than the air purifier sensor based pollution value, the computing device 110 may communicate with the air purifier 120 to reduce the sensitivity of measurements from the one or more electronic pollution sensors 122.

Although certain steps of FIG. 4 are described above as being performed by the computing device 110, in some implementations one or more of the steps may be performed by the air purifier 120. For example, the air purifier 120 may include one or more processors that perform at least step 420 and/or step 430.

Figure 5:
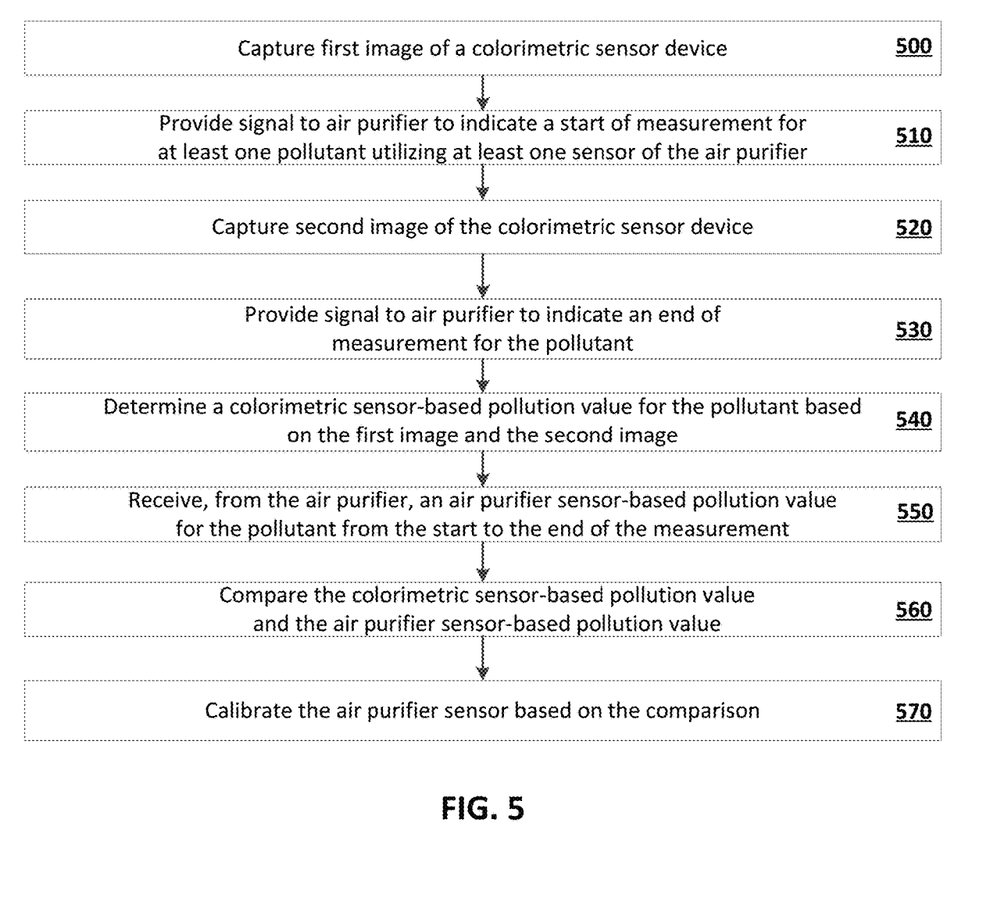
FIG. 5 is a flow chart illustrating another example method of calibrating an electronic sensor of an air purifier based on a colorimetric sensor based pollution value.
Figure 6:
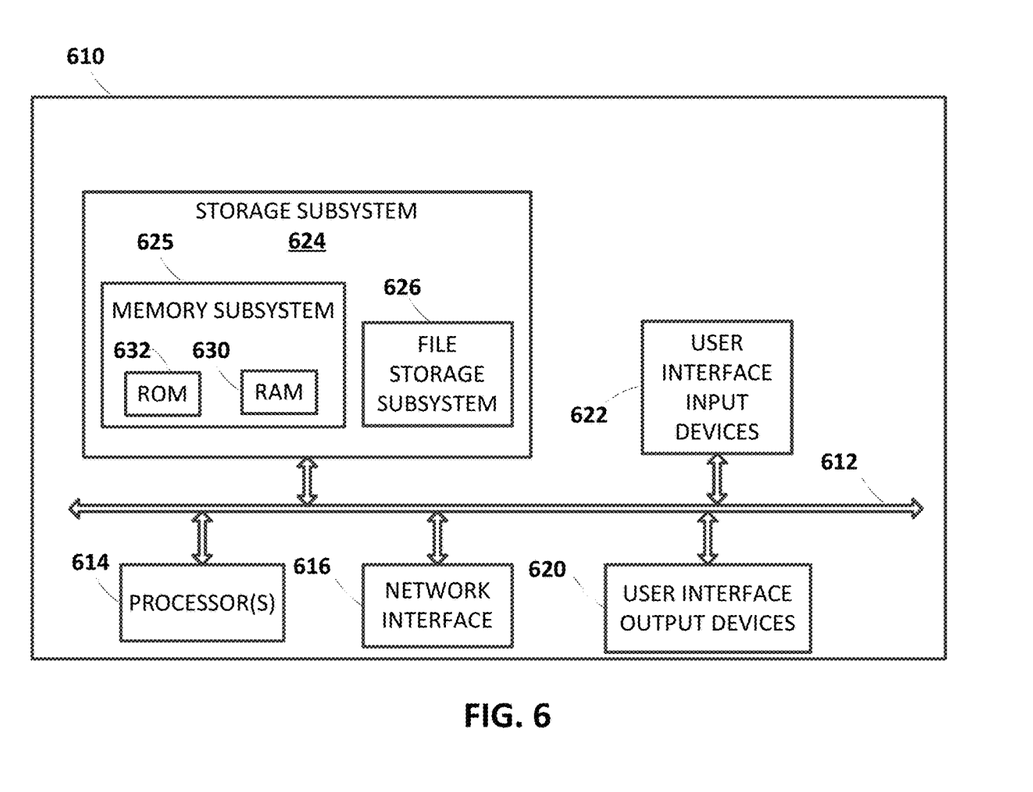
FIG. 6 illustrates an example architecture of a computing device.

FIG. 5 is a flow chart illustrating another example method of calibrating an electronic sensor of an air purifier based on a colorimetric sensor based pollution value. Other implementations may perform the steps in a different order, omit certain steps, and/or perform different and/or additional steps than those illustrated in FIG. 5. For convenience, aspects of FIG. 5 will be described with reference to a system of one or more components that perform the process. The system may include, for example, the computing device 110 and/or the air purifier 120.

At step 500, a first image of a colorimetric sensor device is captured. In some implementations, this step may share one or more aspects in common with step 300 and/or step 305 of FIG. 3.

At step 510, a signal is provided to an air purifier to indicate a start of measurement for at least one pollutant utilizing at least one sensor of the air purifier. For example, the computing device 110 may provide a signal to the air purifier 120 on or shortly before or after (e.g., within 5-10 seconds) step 500 to cause the air purifier to begin measurement of the at least one pollutant utilizing one of the electronic pollution sensors 122 and/or to indicate a start time of a sensing period for an optionally already ongoing measurement of the at least one pollutant.

At step 520, a second image of the colorimetric sensor device is captured. In some implementations, this step may share one or more aspects in common with step 310 and/or step 315 of FIG. 3.

At step 530, a signal is provided to the air purifier to indicate an end of the measurement for the pollutant. For example, the computing device 110 may provide a signal to the air purifier 120 on or shortly before or after (e.g., within 5-10 seconds) step 520 to cause the air purifier to stop measurement of the at least one pollutant utilizing one of the electronic pollution sensors 122 and/or to indicate an end time of a sensing period for an optionally continuing measurement of the at least one pollutant.

At step 540, a colorimetric sensor based pollution value is determined for the pollutant base on the first image and the second image. In some implementations, this step may share one or more aspects in common with step 320 of FIG. 3.

At step 550, an air purifier sensor based pollution value is received from the air purifier for the pollutant from the start to the end of the measurement. For example, the computing device 110 may receive, from the air purifier 120, an air purifier sensor based pollution value that indicates a cumulative, average, or other statistical measure of the pollutant as measured by one of the electronic pollution sensors 122. The air purifier 120 may determine such statistical measure based on the signals received at step 510 and 530. In other words, the statistical measure may include measures on or after the signal being received at step 510 and on or before the signal being received at step 530. In some implementations, step 550 may share one or more aspects in common with step 410 of FIG. 4.

At step 560, the colorimetric sensor based pollution value and the air purifier sensor based pollution value are compared. In some implementations, this step may share one or more aspects in common with step 420 of FIG. 4.

At step 570, the air purifier sensor is calibrated based on the comparison of step 560. In some implementations, this step may share one or more aspects in common with step 430 of FIG. 4.

Although certain steps of FIG. 5 are described above as being performed by the computing device 110, in some implementations one or more of the steps may be performed by the air purifier 120. For example, the air purifier 120 may include one or more processors that perform at least step 550, step 560, and/or step 570.

FIG. 6 is a block diagram of an example computing device 610. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface input devices 622, user interface output devices 620, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform one or more aspect of one or more of the methods described herein such as, for example, the methods of FIGS. 3, 4, and/or 5.

These software modules are generally executed by the at least one processor 614 alone or in combination with other processors. Memory subsystem 625 used in the storage subsystem can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several inventive implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive implementations described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

"Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method, comprising:
    capturing an electronic image of a device having a colorimetric sensor and a reference color display, the colorimetric sensor being configured to change color in response to exposure to one or more pollutants, wherein a degree of change of the color of the colorimetric sensor in the electronic image is dependent on a concentration of the one or more pollutants, and wherein the reference color display is static and includes a plurality of colors indicative of a range of levels of a concentration of the one or more pollutants;
    determining a color of the colorimetric sensor in the electronic image;
    determining a modified color of the colorimetric sensor in the electronic image based on the color of the colorimetric sensor in the electronic image and based on one or more image colors of the reference color display in the electronic image; and
    determining a pollution value for the one or more pollutants based on an electronic mapping of the pollution value to the modified color of the colorimetric sensor in the electronic image.

2. The method of claim 1, further comprising:
    identifying an air purifier pollution value for the one or more pollutants, the air purifier pollution value being based on one or more measurements of an electronic sensor of an air purifier; and
    determining an adjustment to calibrate the electronic sensor of the air purifier based on comparing the pollution value to the air purifier pollution value.

3. The method of claim 2, wherein determining the adjustment to calibrate the electronic sensor of the air purifier includes:
    communicating the air purifier pollution value; and
    comparing air purifier pollution value to the pollution value.

4. The method of claim 2, wherein the adjustment to calibrate the electronic sensor of the air purifier includes:
    changing a sensitivity of measurements from the electronic sensor of the air purifier.

5. The method of claim 2, further comprising adjusting a volume of air processed by the air purifier based on the air purifier pollution value.

6. The method of claim 2, further comprising: activating and/or deactivating one or more components of the air purifier based on the air purifier pollution value.

7. The method of claim 1, wherein determining the modified color of the colorimetric sensor in the electronic image based on the color of the colorimetric sensor in the electronic image and based on the one or more image colors of the reference color display in the electronic image comprises:
    determining a color adjustment of the color of the colorimetric sensor in the electronic image based on a comparison of the one or more image colors of the reference color display to one or more anticipated colors of the one or more image colors of the reference color display in the electronic image; and
    modifying the color of the colorimetric sensor in the electronic image based on the color adjustment to determine the modified color of the colorimetric sensor in the electronic image.

8. The method of claim 1, wherein determining the modified color of the colorimetric sensor in the electronic image based on the color of the colorimetric sensor in the electronic image and based on the one or more image colors of the reference color display in the electronic image comprises:
    matching the color of the colorimetric sensor in the electronic image to a reference color of the image colors of the reference color display in the electronic image; and
    determining the modified color of the colorimetric sensor in the electronic image based on a position, in the electronic image, of the reference colorof the image colors of the reference color display in the electronic image.

9. A system, comprising:
    a colorimetric sensor device having a colorimetric sensor and a reference color display, wherein the colorimetric sensor is configured to change color in response to exposure to one or more pollutants, and wherein the reference color display is static and includes a range of colors indicative of a range of a level of concentrations of the one or more pollutants;
    at least one computing device having one or more processors and memory storing instructions;
    wherein an execution of the instructions by the one or more processors causes the at least one computing device to:
    capture an electronic image of a device having a colorimetric sensor and a reference color display, the colorimetric sensor being configured to change color in response to exposure to one or more pollutants, wherein a degree of change of the color of the colorimetric sensor is dependent on a concentration of the one or more pollutants;

determine a color of the colorimetric sensor in the electronic image;

determine a modified color of the colorimetric sensor in the electronic image based on the color of the colorimetric sensor in the electronic image and based on one or more image colors of the reference color display in the electronic image; and determine a pollution value for the one or more pollutants based on an electronic mapping of the pollution value to the modified color of the colorimetric sensor in the electronic image.

10. The system of claim 9, wherein execution of the instructions by the one or more processors further causes the at least one computing device to:

identify an air purifier pollution value for the one or more pollutants, the air purifier pollution value being based on one or more measurements of anelectronic sensor of an air purifier; and determine an adjustment to calibrate the electronic sensor of the air purifier based on comparing the pollution value to the air purifier pollution value.

11. The system of claim 10, wherein execution of the instructions by the one or more processors that causes the at least one computing device to determine the adjustment to calibrate the electronic sensor of the air purifier further causes the the at least one computing device to:

communicate the air purifier pollution value; and
compare air purifier pollution value to the pollution value.

12. The system of claim 10, wherein the execution of the instructions by the one or more processors that causes the at least one computing device to determine the adjustment to calibrate the electronic sensor of the air purifier further causes the at least one computing device to:

change a sensitivity of measurements from the electronic sensor of the air purifier.

13. The system of claim 10, wherein execution of the instructions by the one or more processors further causes the at least one computing device to:

adjust a volume of air processed by the air purifier based on the air purifier pollution value.

14. The system of claim 10, wherein execution of the instructions by the one or more processors further causes the at least one computing device to:

activate and/or deactivate one or more components of the air purifier based on the air purifier pollution value.

15. The system of claim 9, wherein execution of the instructions by the one or more processors that causes the at least one computing device to determine the modified color of the colorimetric sensor in the electronic image based on the color of the colorimetric sensor in the electronic image and based on the one or more image colors of the reference color display in the electronic image further causes the the at least one computing device to:

determine a color adjustment of the colorimetric sensor in the electronic image based on comparison of the one or more image colors of the reference color display to one or more anticipated colors of the one or more image colors of the reference color display in the electronic image; and modify the color of the colorimetric sensor in the electronic image based on the color adjustment to determine the modified color of the colorimetric sensor in the electronic image.

16. The system of claim 9, wherein execution of the instructions by the one or more processors that causes the at least one computing device to determine the modified color of the colorimetric sensor in the electronic image based on the color of the colorimetric sensor in the electronic image and based on the one or more image colors of the reference color display in the electronic image further causes the the at least one computing device to:

match the color of the colorimetric sensor in the electronic image to a reference color of the image colors of the reference color display in the electronic image; and determine the modified color of the colorimetric sensor in the electronic image based on a position, in the electronic image, of the reference color in the reference color display in the electronic image.

17. The system of claim 9, further comprising a camera adapted to effect the capture of the electronic image of the device.

18. A colorimetric sensor device, comprising:

a plurality of colorimetric sensors, wherein each of the colorimetric sensors changes color in response to exposure to one or more respective pollutants, and to a degree that is dependent on a concentration of the one or more pollutants, wherein a first colorimetric sensor of the colorimetric sensors changes color in response to exposure to a first pollutant and does not change color in response to exposure a second pollutant, and wherein a second colorimetric sensor of the colorimetric sensors changes color in response to exposure to the second pollutant and does not change color in response to exposure the first pollutant, or wherein the second colorimetric sensor of the colorimetric sensors changes color in response to exposure to the first pollutant and has a different degree of sensitivity to the first pollutant than a degree of sensitivity of the first colorimetric sensor to the first pollutant; and a static reference color display of a range of colors indicative of a range of levels of concentration of pollutants associated with the static reference color display.

19. The colorimetric sensor device of claim 18, wherein the static reference color display includes a longitudinally extending color strip of the range of colors along a length of the longitudinally extending color strip.

20. The colorimetric sensor device of claim 18, wherein the static reference color display of the range of colors is the only indicator of the range of levels of concentrations of any pollutants associated with the static reference color display.

* * * * *